United States Patent [19]

Logsdon et al.

[11] Patent Number: 4,654,780
[45] Date of Patent: Mar. 31, 1987

[54] PARALLEL REGISTER TRANSFER MECHANISM FOR A REDUCTION PROCESSOR EVALUATING PROGRAMS STORED AS BINARY DIRECTED GRAPHS EMPLOYING VARIABLE-FREE APPLICATIVE LANGUAGE CODES

[75] Inventors: Gary L. Logsdon; Mark R. Scheevel; Brent C. Bolton, all of Austin, Tex.

[73] Assignee: Burroughs Corporation, Detroit, Mich.

[21] Appl. No.: 617,531

[22] Filed: Jun. 5, 1984

[51] Int. Cl.⁴ .............................................. G06F 13/00
[52] U.S. Cl. .................................................... 364/200
[58] Field of Search ... 364/200 MS File, 900 MS File

[56] References Cited

U.S. PATENT DOCUMENTS 3,710,348  1/1973  Craft .................................. 364/900

Primary Examiner—Raulfe B. Zache
Attorney, Agent, or Firm—Mervyn L. Young; Kevin R. Peterson; Laurence J. Marhoefer

[57] ABSTRACT

A parallel register-transfer mechanism has been disclosed above for use in the evaluation of expressions of a variable-free applicative language stored as binary directed graphs. The expression is reduced through a series of transformations until a result is obtained. A register file is provided with several crossbar networks interconnecting the various registers in the file for simultaneous transfer of their contents.

8 Claims, 15 Drawing Figures

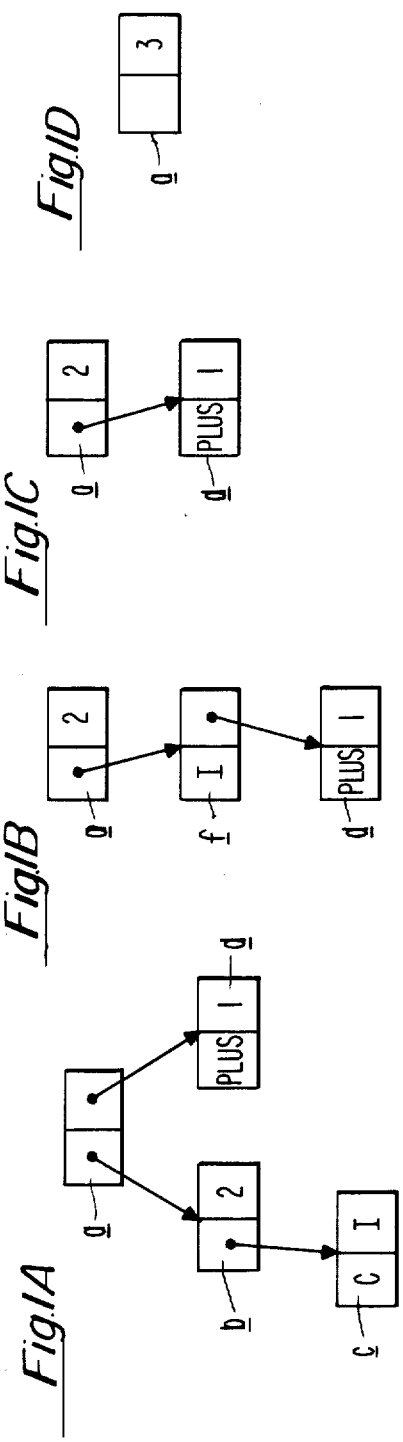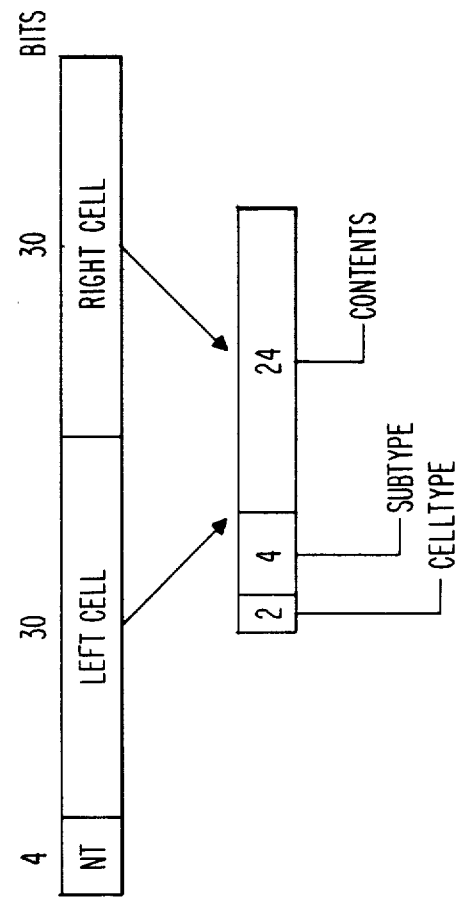

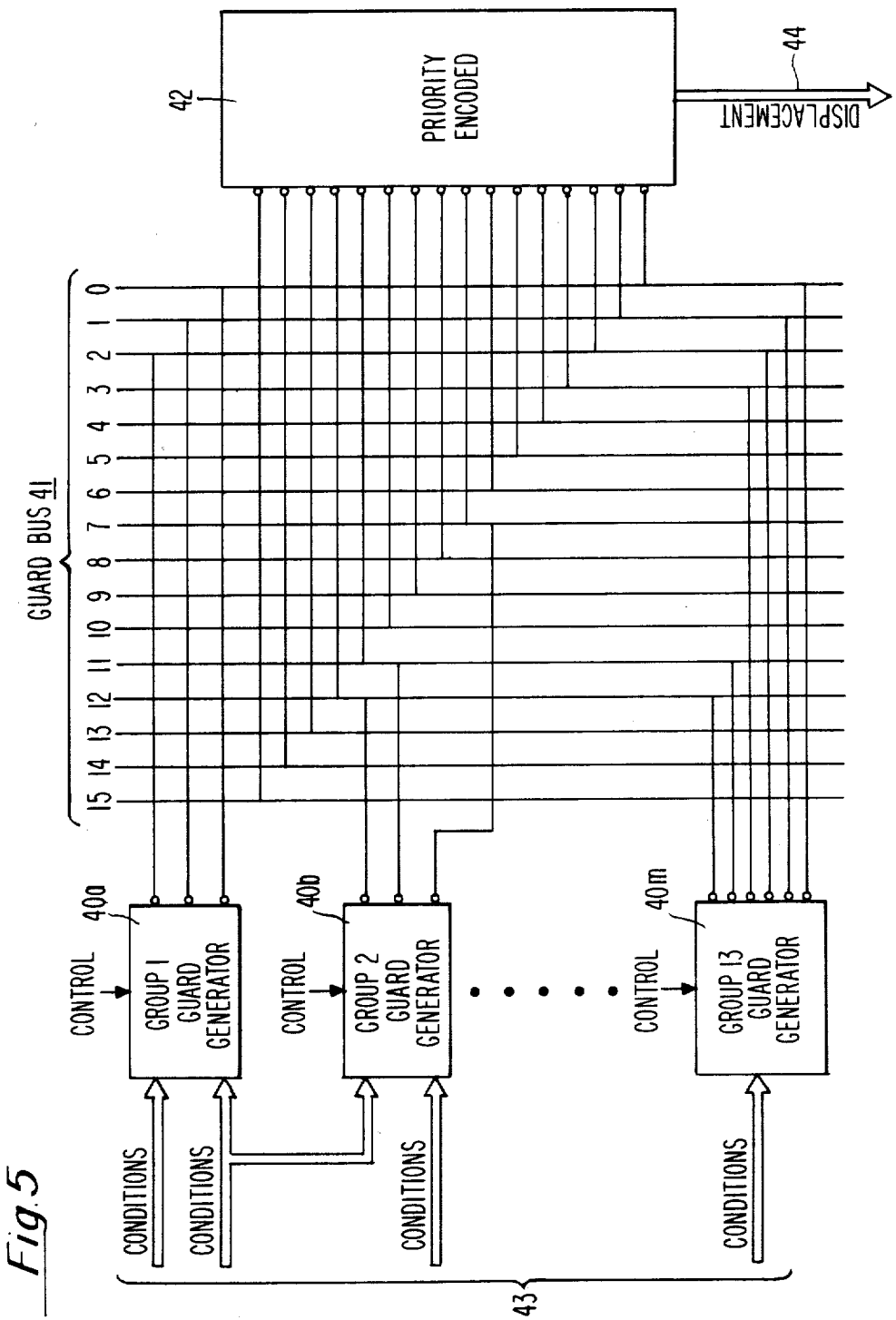

*Fig.7B*

| DESTINATIONS → | | AP | BP.L | BP.R | B0.L | B0.R | B1.L | B1.R | B2.L | B2.R | B3.L | B3.R | DP.L | DP.R | F | NNA | R | T.L | T.R |
|---|---|---|---|---|---|---|---|---|---|---|---|---|---|---|---|---|---|---|---|
| S O U R C E S | BP.L |   |   |   |   |   |   |   |   |   | X |   |   |   |   |   | X |   |   |
| | BP.R |   |   |   |   |   |   |   |   |   |   | X |   |   |   |   |   |   | X |
| | B0.L | X |   |   | X | X | X | X | X | X | X | X | X | X | X |   | X | X | X |
| | B0.R | X |   |   | X | X | X | X | X | X | X | X | X | X | X |   | X | X | X |
| | B1.L | X |   |   | X | X | X | X | X | X | X | X | X | X | X |   | X | X | X |
| | B1.R | X |   |   | X | X | X | X | X | X | X | X | X | X | X |   | X | X | X |
| | B2.L | X |   |   | X | X | X | X | X | X | X | X | X | X | X |   | X | X | X |
| | B2.R | X |   |   | X | X | X | X | X | X | X | X | X | X | X |   | X | X | X |
| | B3.L | X | X |   | X | X | X | X | X | X | X | X | X | X | X |   | X | X | X |
| | B3.R | X |   | X | X | X | X | X | X | X | X | X | X | X |   | X | X | X | X |
| | BP.L |   |   |   | X | X | X | X | X | X | X | X | X |   |   | X | X | X | X |
| | DP.R |   |   |   | X | X | X | X | X | X | X | X | X | X |   | X | X | X | X |
| | F | X |   |   | X | X | X | X | X | X | X | X | X | X | X |   | X | X | X |
| | LIT |   |   |   | X | X | X | X | X | X | X | X | X | X |   |   | X | X | X |
| | NNA | X |   |   | X | X | X | X | X | X | X | X | X | X |   |   | X | X | X |
| | NNP |   |   |   |   |   |   |   |   |   |   |   |   |   |   | X |   |   |   |
| | P | X |   |   | X | X | X | X | X | X | X | X | X | X | X |   | X | X | X |
| | T.L | X |   |   | X | X | X | X | X | X | X | X | X | X | X | X | X | X | X |
| | T.R | X |   |   | X | X | X | X | X | X | X | X | X | X | X | X | X | X | X |

Fig. 7C

NODE TYPE CROSSBAR

| SOURCES ↓ \ DESTINATIONS → | AP.L | BP.L | BP.NT | B0.L | B0.NT | B1.L | B1.NT | B2.L | B2.NT | B3.NT | B3.L | DP.L | DP.NT | F.NT | NNA | R.NT | T.L | T.R.NT |
|---|---|---|---|---|---|---|---|---|---|---|---|---|---|---|---|---|---|---|
| BP.L / BP.NT / B0.L |   |   |   |   |   |   |   |   |   | X |   |   |   |   |   | X |   |   |
| B0.NT |   |   |   |   | X |   | X | X |   | X |   | X | X |   |   | X |   | X |
| B1.L |   |   |   |   |   |   |   |   |   |   |   |   |   |   |   |   |   |   |
| B1.NT |   |   |   |   | X |   | X | X |   | X |   | X | X |   |   | X |   | X |
| B2.L / B2.NT / B3.L |   |   |   |   | X |   | X | X |   | X |   | X | X |   |   | X |   | X |
| B3.NT / DP.L |   | X |   |   | X |   | X | X |   | X |   | X | X |   |   | X |   | X |
| DP.NT |   |   |   |   | X |   | X | X |   | X |   |   | X |   |   | X |   | X |
| F.NT |   |   |   |   | X |   | X | X |   | X |   | X | X |   |   | X |   | X |
| LIT.NT |   |   |   |   | X |   | X | X |   | X |   | X | X |   |   | X |   | X |
| NNA |   |   |   |   |   |   |   |   |   |   |   |   |   |   |   |   |   |   |
| NNP |   |   |   |   |   |   |   |   |   |   |   |   |   |   |   |   |   |   |
| R.NT |   |   |   |   | X |   | X | X |   | X |   | X | X |   |   | X |   | X |
| T.L |   |   |   |   | X |   | X | X |   | X |   | X | X |   |   | X |   | X |
| T.R.NT |   |   |   |   | X |   | X | X |   | X |   | X |   |   |   | X |   | X |

Fig. 7D

CELL TYPE CROSSBAR

| DESTINATIONS → | AP | BP.LC.CT | BP.RC.CT | B0.LC.CT | B0.RC.CT | B1.LC.CT | B1.RC.CT | B2.LC.CT | B2.RC.CT | B3.LC.CT | B3.RC.CT | DP.LC.CT | DP.RC.CT | F.CT | NNA | R.CT | T.LC.CT | T.RC.CT |
|---|---|---|---|---|---|---|---|---|---|---|---|---|---|---|---|---|---|---|
| SOURCES | | | | | | | | | | | | | | | | | | |
| BP.LC.CT |  |  |  |  |  |  |  |  |  | X |  |  |  |  |  | X |  |  |
| BP.RC.CT |  |  |  |  |  |  |  |  |  |  | X |  |  |  |  |  |  | X |
| B0.LC.CT |  |  |  | X | X | X | X | X | X | X | X | X | X | X |  | X | X | X |
| B0.RC.CT |  |  |  | X | X | X | X | X | X | X | X | X | X | X |  | X | X | X |
| B1.LC.CT |  |  |  | X | X | X | X | X | X | X | X | X | X | X |  | X | X | X |
| B1.RC.CT |  |  |  | X | X | X | X | X | X | X | X | X | X | X |  | X | X | X |
| B2.LC.CT |  |  |  | X | X | X | X | X | X | X | X | X | X | X |  | X | X | X |
| B2.RC.CT |  |  |  | X | X | X | X | X | X | X | X | X | X | X |  | X | X | X |
| B3.LC.CT | X |  |  | X | X | X | X | X | X | X | X | X | X | X |  | X | X | X |
| B3.RC.CT |  | X |  | X | X | X | X | X | X | X | X | X | X | X |  | X | X | X |
| DP.LC.CT |  |  |  | X | X | X | X | X | X | X | X | X | X |  | X | X | X | X |
| DP.RC.CT |  |  |  | X | X | X | X | X | X | X | X |  |  |  | X | X | X | X |
| F.CT |  |  |  | X | X | X | X | X | X | X | X | X | X |  |  | X | X | X |
| LIT.CT |  |  |  | X | X | X | X | X | X | X | X | X | X |  |  | X | X | X |
| NNA |  |  |  |  |  |  |  |  |  |  |  |  |  |  |  |  |  |  |
| NNP |  |  |  |  |  |  |  |  |  |  |  |  |  |  |  |  |  |  |
| R.CT |  |  |  | X | X | X | X | X | X | X | X | X | X |  |  | X | X | X |
| T.LC.CT |  |  |  | X | X | X | X | X | X | X | X | X | X |  |  | X | X | X |
| T.RC.CT |  |  |  | X | X | X | X | X | X | X | X | X | X |  |  | X | X | X |

Fig. 7E

SUBTYPE CROSSBAR

| | AP.LC.ST | BP.LC.ST | BP.RC.ST | B0.LC.ST | B0.RC.ST | B1.LC.ST | B1.RC.ST | B2.LC.ST | B2.RC.ST | B3.LC.ST | B3.RC.ST | DP.LC.ST | DP.RC.ST | F.ST | NNA | R.ST | T.LC.ST | T.RC.ST |
|---|---|---|---|---|---|---|---|---|---|---|---|---|---|---|---|---|---|---|
| DESTINATIONS → | | | | | | | | | | | | | | | | | | |
| SOURCES ↓ | | | | | | | | | | | | | | | | | | |
| BP.LC.ST | | | | | | | | | | X | | | | | | X | | |
| BP.RC.ST | | | | | | | | | | | X | | | | | | | X |
| B0.LC.ST | | | | X | X | X | X | X | X | X | X | X | X | X | | X | X | X |
| B0.LC.ST | | | | X | X | X | X | X | X | X | X | X | X | X | | X | X | X |
| B1.LC.ST | | | | X | X | X | X | X | X | X | X | X | X | X | | X | X | X |
| B1.RC.ST | | | | X | X | X | X | X | X | X | X | X | X | X | | X | X | X |
| B2.LC.ST | | | | X | X | X | X | X | X | X | X | X | X | X | | X | X | X |
| B2.RC.ST | | | | X | X | X | X | X | X | X | X | X | X | X | | X | X | X |
| B3.LC.ST | X | | | X | X | X | X | X | X | X | X | X | X | X | | X | X | X |
| B3.RC.ST | | X | | X | X | X | X | X | X | X | X | X | X | X | | X | X | X |
| DP.LC.ST | | | | X | X | X | X | X | X | X | X | | | X | | X | X | X |
| DP.RC.ST | | | | X | X | X | X | X | X | X | X | | | X | | X | X | X |
| F.ST | | | | X | X | X | X | X | X | X | X | X | X | X | | X | X | X |
| LIT.ST | | | | X | X | X | X | X | X | X | X | X | X | X | | X | X | X |
| NNA | | | | | | | | | | | | | | | | | | |
| NNP | | | | | | | | | | | | | | | | | | |
| R.ST | | | | X | X | X | X | X | X | X | X | X | X | X | | X | X | X |
| T.LC.ST | | | | X | X | X | X | X | X | X | X | X | X | X | | X | X | X |
| T.RC.ST | | | | X | X | X | X | X | X | X | X | X | X | X | | X | X | X |

Fig. 7F

CONTENTS CROSSBAR

| DESTINATIONS → | AP | BP.LC.C | BP.RC.C | B0.LC.C | B0.RC.C | B1.LC.C | B1.RC.C | B2.LC.C | B2.RC.C | B3.LC.C | B3.RC.C | DP.LC.C | DP.RC.C | F.C | NNA | R.C | T.LC.C | T.RC.C |
|---|---|---|---|---|---|---|---|---|---|---|---|---|---|---|---|---|---|---|
| SOURCES | | | | | | | | | | | | | | | | | | |
| BP.LC.C |   |   |   |   |   |   |   |   |   | X |   |   |   |   |   | X |   |   |
| BP.RC.C |   |   |   |   |   |   |   |   |   |   | X |   |   |   |   |   |   | X |
| B0.LC.C | X |   |   | X | X | X | X | X | X | X | X | X | X | X |   | X | X | X |
| B0.RC.C | X |   |   | X | X | X | X | X | X | X | X | X | X | X |   | X | X | X |
| B1.LC.C | X |   |   | X | X | X | X | X | X | X | X | X | X | X |   | X | X | X |
| B1.RC.C | X |   |   | X | X | X | X | X | X | X | X | X | X | X |   | X | X | X |
| B2.LC.C | X |   |   | X | X | X | X | X | X | X | X | X | X | X |   | X | X | X |
| B2.RC.C | X |   |   | X | X | X | X | X | X | X | X | X | X | X |   | X | X | X |
| B3.LC.C | X | X |   | X | X | X | X | X | X | X | X | X | X | X |   | X | X | X |
| B3.RC.C |   |   |   | X |   | X | X | X | X | X | X | X | X | X |   | X | X | X |
| DP.LC.C |   |   |   | X | X | X | X | X | X | X | X |   |   |   | X | X | X | X |
| DP.RC.C |   |   |   | X | X | X | X | X | X | X | X |   |   |   | X | X | X | X |
| F.C | X |   |   | X | X | X | X | X | X | X | X | X | X |   |   | X | X | X |
| LIT.C |   |   |   | X | X | X | X | X | X | X | X | X | X |   |   | X | X | X |
| NNA | X |   |   | X | X | X | X | X | X | X | X | X | X |   |   | X | X | X |
| NNP |   |   |   |   |   |   |   |   |   |   |   |   |   |   | X |   |   |   |
| R.C | X |   |   | X | X | X | X | X | X | X | X | X | X | X | X | X | X | X |
| T.LC.C | X |   |   | X | X | X | X | X | X | X | X | X | X | X | X | X | X | X |
| T.RC.C | X |   |   | X | X | X | X | X | X | X | X | X | X | X | X | X | X | X |

PARALLEL REGISTER TRANSFER MECHANISM FOR A REDUCTION PROCESSOR EVALUATING PROGRAMS STORED AS BINARY DIRECTED GRAPHS EMPLOYING VARIABLE-FREE APPLICATIVE LANGUAGE CODES

RELATED U.S. PATENT APPLICATIONS

U.S. patent applications directly or indirectly related to the subject application are the following:

Ser. No.: 617,526, filed June 5, 1984, by Gary E. Logsdon, et al. and entitled "Graph Manager for a Reduction Processor Executing Programs Stored as Binary Directed Graphs Employing Variable-Free Applicative Language Codes";

Ser. No.: 617,532, filed June 5, 1984, U.S. Pat. No. 4,615,003 by Gary E. Logsdon, et al. and entitled "Condition Concentrator and Control Store for a Reduction Procressor Executing Programs Stored as Binary Directed Graphs Employing Variable-Free Applicative Language Codes".

BACKGROUND OF THE INVENTION

1. Field of the Invention

This invention relates to a parallel register transfer mechanism for a digital processor which is adapted to evaluate programs represented as binary directed graphs, and more particularly to a processor that evaluates such graphs by progressive substitutions of equivalent graphs.

2. Description of the Prior Art

Most digital computers on the market today are still of the type first postulated by John von Neumann and are sequential in their execution of commands. The first higher-level languages for programming computers, such as FORTRAN and COBOL, reflected this organization, and left with the programmer the responsibilities of storage management and control-flow management, as well as the design of the algorithm to be implemented by the computer. Pure applicative languages, such as pure LISP, differ from imperative languages by relieving the programmer of these management responsibilities.

An alternative to pure LISP is the Saint Andrews Static Language, or SASL, which was developed by David A. Turner (*SASL Language Manual*, University of St. Andrews, (1976). By introducing a number of constants called "combinators", this language may be transformed into a variable-free notation (D. A. Turner, "A New Implementation Technique for Applicative Languages", *Software—Practice and Experience*, Vol. 9, pp. 31-49, 1979). This notation is particularly advantageous for handling higher-order functions (which may take functions as arguments and return functions as results) and non-strict functions (which may return a result even if one or more arguments are undefined).

The implementation technique developed by Turner employs a set of primitive functions such as plus, minus, and so forth, and a set of combinators, which are higher-order non-strict functions. These operators are formally defined by substitution rules, some examples of which are S f g x→f x (g x)
K x y→x
I x→x
Y h→h (Y h)
C f x y→f y x
B f g x→f (g x)
cond p x y→
   x, if p is true
   y, if p is false
plus m n→r, where m and n must already have been reduced to numbers and r is the sum of m and n.

Other combinators and their definitions are to be found in the above referenced Turner publication.

This combinator notation may be conveniently represented as a binary directed graph in which each node represents the application of a function to an argument. (These graphs are known as SK-graphs from the names of the first two combinators.) The substitution rules may then be interpreted as graph transformation rules, and these graphs (and, therefore, the programs they represent) may be evaluated, in a process known as reduction, by a processor of a fairly simple nature. Such a reduction processor is disclosed in the Bolton et al. U.S. Pat. No. 4,447,875, entitled "Reduction Processor for Executing Programs Stored as Treelike Graphs Employing Variable-Free Applicative Language Codes".

Details of the reduction process can be found in the Turner paper, but a brief example is helpful. FIGS. 1A-D illustrate the reduction of a graph representing the SASL program.

successor 2
WHERE
   successor x=1+x

This program is translated (compiled) into the combinator expression

C I 2 (plus 1)

that is represented by the graph in FIG. 1A. Successive transformations of this graph yield I (plus 1) 2: using the C rule (FIG. 1B)
plus 1 2: using the I rule (FIG. 1C)
3: using the plus rule (FIG. 1D)

The substitutions performed to reduce a graph require the manipulation of a number of different pieces cf data, such as pointers and combinator codes, which are shifted from one location to another in a register file. In the embodiment disclosed in the above referenced Bolton et al. application, each graph-reduction step required a sequence of register-file transfers. In many cases, however, the required transfers between registers could be performed simultaneously, with a consequent increase in speed.

It is then an object of the present invention to provide an improved processing system for the evaluation of binary directed graphs through a series of substitutions.

It is another object of the present invention to provide such a processor wherein each substitution can be accomplished by a number of simultaneous register transfers.

It is still a further object of the present invention to provide an improved register file for such a reduction processor which accommodates the simultaneous transfer of register contents between the respective registers making up the file.

SUMMARY OF THE INVENTION

To accomplish the above-identified objects, the present invention resides in a register file for employment in an applicative language reduction processor. This file is provided with several crossbar networks interconnecting the various registers in the file for simultaneous transfer of their contents.

A feature then in the present invention resides in a parallel register transfer mechanism for a reduction processor intended for evaluating applicative language programs represented as binary directed graphs.

BRIEF DESCRIPTION OF THE DRAWINGS

The above and other objects, advantages, and features of the present invention may become readily apparent from a review of the following specification when taken in conjunction with the drawings wherein:

FIGS. 1A, B, C, and D represent binary directed graphs of the type for which the present invention is intended;

FIG. 5 is a diagram of the condition concentrator of the present invention;

FIG. 6 is a diagram of the format of a node of the type from which graphs are formed;

FIGS. 7A-F are diagrams detailing the register-transfer mechanism of the present invention.

GENERAL DESCRIPTION OF THE INVENTION

Figure 2:
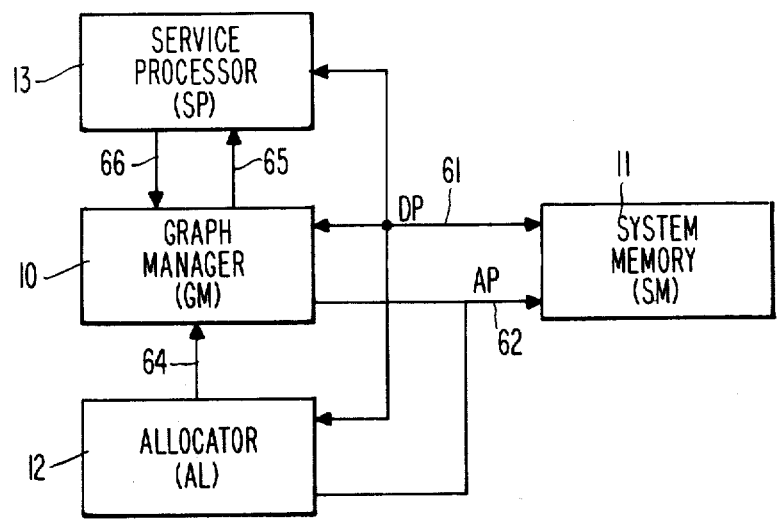
FIG. 2 illustrates a system employing the present invention.

The system employing the present invention is illustrated in FIG. 2. The principal element is graph manager 10, which contains a data section which caches some of the nodes of a graph that is to be reduced and allows for those nodes to be manipulated to perform the series of substitutions required for the graph reduction. The system includes a system memory 11 which provides storage for all of the nodes of the graph and allocator 12 which scans the system memory for unused words whose addresses it queues for use by the graph manager. The allocator also maintains a count of the number of addresses queued. Service processor 13 supports a wide variety of data transfers to a host processor (not shown); it also provides a floating point arithmetic facility.

A particular problem with the graph reduction techniques of prior art systems can be better illustrated with reference again to FIGS. 1A-D. It will be appreciated that in the transformation of the graph in FIG. 1A to that of FIG. 1B, the contents of the right cell of node b must be transferred to the right cell of node a, the right cell of node c must be transferred to the left cell of node f and the right cell of node a must be transferred to the right cell of node f. In prior art reduction processors, this series of transfers was performed sequentially, and a similar series of transfers was performed to reduce the graph of FIG. 1B to that of FIG. 1C and so on. It is the purpose of the present invention to provide a parallel register-transfer mechanism by which each sequence of register transfers may be performed simultaneously, thus speeding up the reduction process.

DETAILED DESCRIPTION OF THE INVENTION

Figure 3:
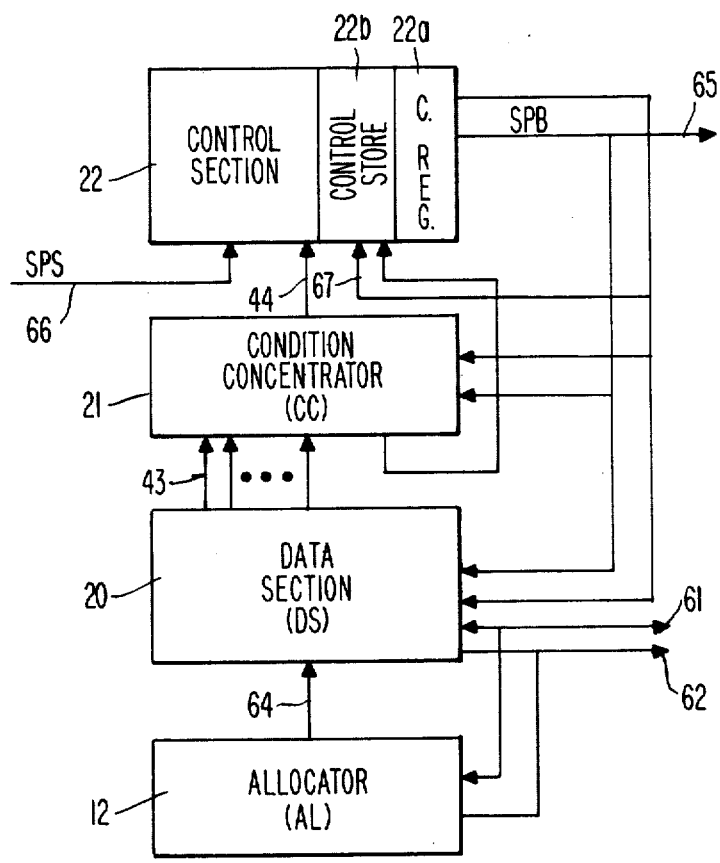
FIG. 3 is a diagram of the graph manager section of the present invention.

Graph manager 10 of FIG. 2 is shown in slightly more detail in FIG. 3, including its communications with allocator 12. The graph manager includes data section 20, condition concentrator 21, and control section 22.

Data section 20 stores a portion of the graph being reduced and allows fields to be transferred between various registers therein concurrently. Values of some of these fields are sent to condition concentrator 21 for reasons that will be described below. This data section is shown in more detail in FIG. 4 and its register file is shown in detail in FIGS. 7A-F.

Control section 22 is a simple state machine with a writable control store 22b in which the microprogram for the state machine is stored. Microinstruction addresses are generated by concatenating the displacement field received from condition concentrator 21 with the next-address field in control register 22a, which in turn receives the selected microinstruction.

Figure 4:
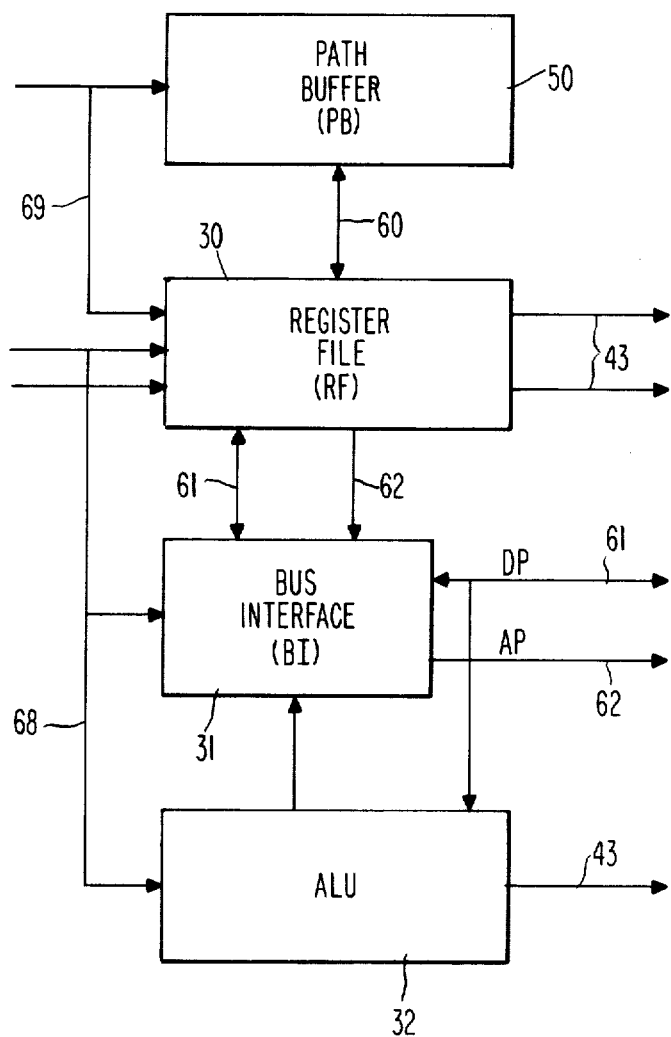
FIG. 4 is a diagram of the data section of the present invention.

The organization of data section 20 of FIG. 3, illustrated in FIG. 4, includes register file 30 which is the primary mechanism for parallel transfer between registers to perform a graph substitution. Also shown in FIG. 4 is path buffer 50, which is a stack memory used to store ancestors of the nodes stored in register file 30. Both the register file and the path buffer are more thoroughly described below in relation to FIGS. 7A-F. Arithmetic-logic unit 32 of FIG. 4 executes simple arithmetic operators, and bus interface unit 31 communicates with the system memory and other units of the system. Condition concentrator 21 of FIG. 3 is illustrated in more detail in FIG. 5. The condition concentrator accepts inputs from register file 30 as well as from arithmetic-logic unit 32, allocator 12, and service processor 13. These inputs are used to generate a displacement value which, as indicated above, is concatenated with the next-address field from control register 22a of FIG. 3 to generate the address of the next microinstruction in control store 22b.

As illustrated in FIG. 5, the condition concentrator includes 13 guard generators, 40a-m, each of which maps a set of input terms, called a "condition group", to a set of "guards". A guard is simply a boolean sum of products of selected terms. Consider, for example, a condition group that has the terms A, B, and C as its numbers. Guards that could be generated from this group include.

A AND B AND C
A OR B OR C
(A AND B) OR (A AND C)
(/A AND /B) OR /C

Each guard generator output is connected to one of the sixteen lines in guard bus 41. The control input to each guard generator from control register 22a selects the guards to be generated and the outputs to be enabled. As indicated above, the input terms are conditions from other system units; their exact nature is not relevant to this document. The combinatorial equations for the guards in each generator are a function of the specific microprogram in use, and are determined when the microprogram is compiled.

Guard bus 41 is a 16-line open-collector bus, any particular line of which may therefore be driven by more than one guard operator at a time. Guard bus 41 actually provides a logical OR function between guards from different guard generators. This affords the microprogrammer the opportunity to specify guards that are the sum of guards from different condition groups.

Guard bus 41 is the input to priority encoder 42. The output of the priority encoder is 4 bits wide and identifies the highest-priority true guard, where the guard on line 0 has the highest priority and that on line 15 the lowest.

Node Format

As indicated above, FIG. 6 illustrates the format in which the nodes of the SK-graph reside in system memory 11, in the various registers of register file 30, and in path buffer 50. Each node contains a node-type field (NT) of four bits and left- and right-cell fields (LC and RC), each of 30 bits. The left- and right-cell fields are further subdivided into a cell-type field (CT) of two bits, a subtype field (ST) of four bits, and a contents field (C) of 24 bits. The various SK operators and values are encoded as combinations of particular values of these fields.

Parallel Register-Transfer Mechanism

Figure 7A:
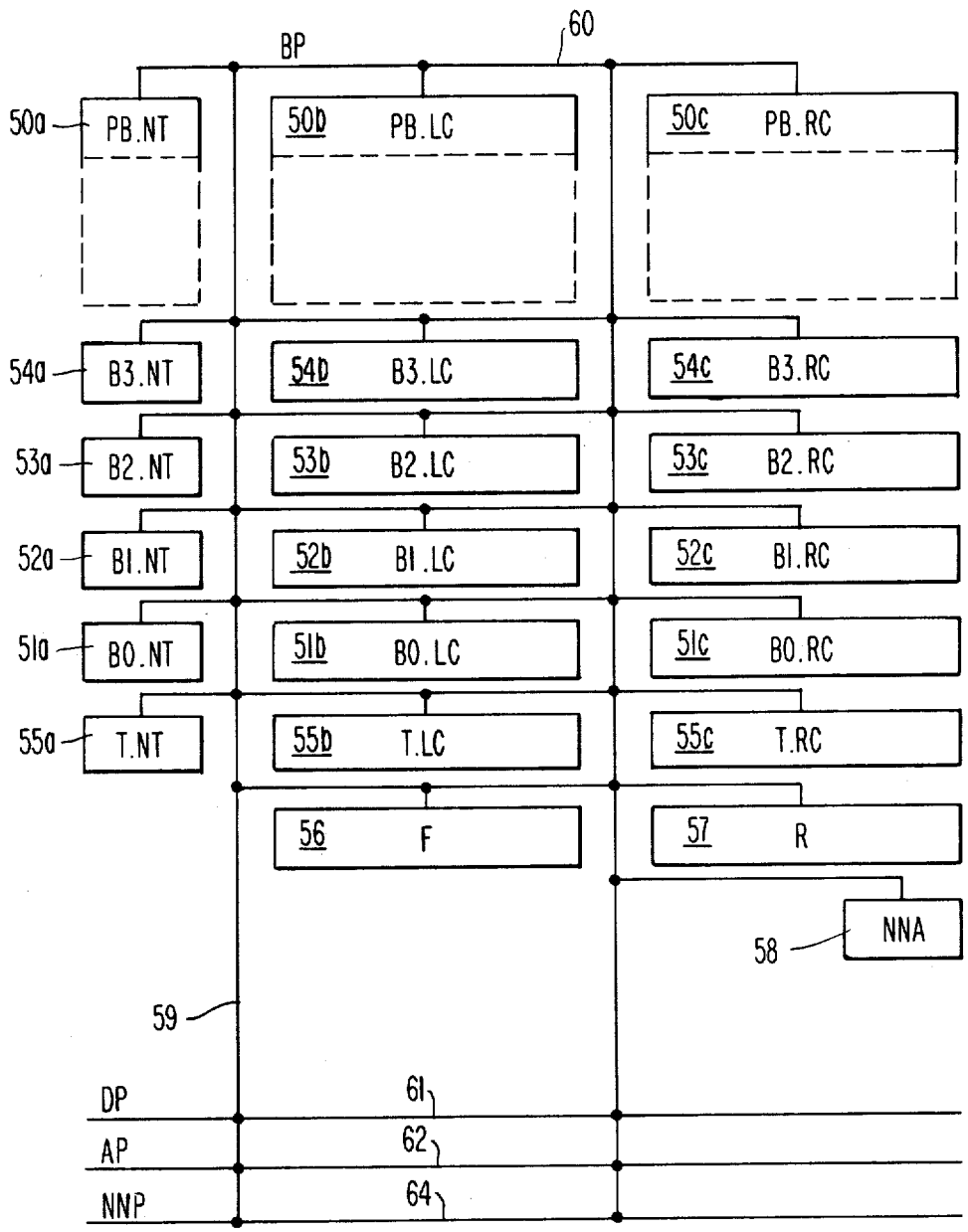

Register file 31 of the data section illustrated in FIG. 4 is shown in detail in FIG. 7A along with an abridged representation of the interconnection network 59. This representation is abridged because of the complexity of network 59 which is actually four crossbar networks that are overlaid to form the total interconnection network. FIGS. 7C–F are tables indicating the actual sources and destination for each of the separate crossbar networks, and FIG. 7B is a table representing a composite of these networks, as will be more thoroughly described below.

With the exception of registers R, F, and NNA, the registers of FIG. 7A are designed to hold nodes of the type illustrated in FIG. 6. Buffer registers B0-B3 (registers 51a-c, 52a-c, 53a-c, 54a-c) store one node each, and usually contain a redex of the graph being reduced. Register T (55a-c) also stores one node, and is used as temporary storage during complicated transformations. As mentioned before, the path buffer (50a-c) is a stack memory used to hold nodes that are ancestors of the nodes in the data section. This path buffer may hold a maximum of 2048 nodes.

F and R (registers 56 and 57) store one cell each, and are principally used during graph traversal, NNA (register 58) stores the address of an unused node, and is 24 bits wide.

In addition to these registers, there are several buses into and out of the register file, and these are also described in FIGS. 7B-F. The buffer port (BP bus 60) is a bidirectional port used to transfer a node from buffer register B3 to the path buffer. BP bus 60 is also used to transfer nodes from the path buffer to the B3 or T registers. During any cycle, BP bus 60 can transfer data into or out of the data section, but it cannot do both.

The data port (DP bus 61) is a bidirectional port used to transfer nodes between the external data bus and the register file. Data transfers involving this port are the same as transfers with a register except that the data port cannot be a source and a destination simultaneously. Data port 61 serves, among other things, as the port to the system memory.

The address port (AP bus 62) is a unidirectional port used to transfer a contents field to the address bus. The data in this port is used to address the system memory. Data transfers involving this port are the same as transfers with a register except that the address port can only be a destination.

The new node port (NNP bus 64) is a unidirectional port used to fill NNA register 58 with addresses supplied by the allocator. This port is not accessible by any other register in the data section.

The function of the interconnection network 59 is, of course, to interconnect the registers and ports of the data section. As was explained above, FIG. 7A is abridged in that network 59 actually consists of four crossbar networks, each of which has its own set of sources, destinations, and controls. Each destination in one of these crossbars has at its input an n-input multiplexor, where n equals the number of possible sources for that destination. Separate control information for each multiplexor is provided by the control register 22a. In this manner, each destination may receive its contents simultaneously, and any register may be a source for more than one destination.

The four crossbar networks that constitute the interconnection network are the Node Type (FIG. 7C), Cell Type (FIG. 7D), Subtype (FIG. 7E), and Contents (FIG. 7F) networks. FIG. 7B is a composite of these four networks. These figures show the connection pattern of each network. Destinations are columns, titled at the top of the table. Sources form the rows of the table and are titled on the left. The X's indicate connections between sources and destinations. For example, in FIG. 7B, reading down the NNA column, one can determine that the NNA register 58 of FIG. 7A has only one source, namely, NNP bus 64. Conversely, by reading across a row, the allowed destination(s) for any particular source can be determined.

EPILOGUE

A parallel register-transfer mechanism has been disclosed above for use in the evaluation of expressions of a variable-free applicative language stored as binary directed graphs. The expression is reduced through a series of transformations until a result is obtained. During the reduction process, the processor transfers nodes to and from memory and performs various operations on those nodes. The processor can also create new nodes in memory and delete unused ones. With the present invention, each reduction can be performed in far fewer steps than in prior art systems.

While but one embodiment of the present invention has been disclosed, it will be apparent to those skilled in the art that variations and modifications may be made therein without departing from the spirit and the scope of the invention as claimed.

What is claimed is:

1. In a processor for manipulating data, a register file, said register file comprising:
   a plurality of registers for storing fields of information;
   interconnection means coupling said registers together for parallel transfer of fields of information from some of said registers to other of said registers; and
   said interconnection means includes a crossbar network for connecting each of the said registers to other of said registers for said parallel information transfer.

2. A register file according to claim 1 wherein:
   said crossbar network is a composite of a plurality of crossbar networks for coupling different fields of such registers to other fields of the other of said registers for parallel transfer of certain of said fields to said other registers.

3. In a reduction processing system having storage means for receiving two-cell nodes representing binary directed graphs employing a variable-free applicative language code, one of such cells in some of each nodes containing a storage address of another node, another of said cells in some of each nodes containing a code representing a functional argument and another of said cells in some of each nodes containing a variable-free operator code specifying a function substitution, said system including a register file, said register file comprising:
- a plurality of registers for storing fields of information:
- interconnection means coupling said registers together for parallel transfer of fields of information from some of said registers to other of said registers; and
- said interconnection means includes a crossbar network for connecting each of the said registers to other of said registers for said parallel information transfer.

4. A register file according to claim 3 wherein:
said plurality of registers includes registers containing information specifying a type of node, registers containing the left cell of a node and registers containing the right cell of a node.

5. A register file according to claim 4 wherein:
said crossbar network is a composite of a plurality of crossbar networks for coupling different fields of said registers to other fields of other of said registers for parallel transfer of certain of said fields to other fields of said other registers.

6. In a reduction processing system having storage means for receiving two-cell nodes representing binary directed graphs supplying a variable-free applicative language code, one of such cells in some of each nodes containing a storage address of another node, another of said cells in some of each nodes containing a code representing a functional argument and another of such cells in some of each nodes containing a variable-free operator code specifying a function substitution, said system comprising:
- a register file including a plurality of registers for storing fields of information and interconnection means coupling said registers together for parallel transfer of fields from some of said registers to other of said registers; and
- a plurality of buffer registers coupled to said register file for storing nodes of portions of the graph being reduced which nodes do not reside in said register file.

7. A system according to claim 6 wherein:
said buffer registers are arranged in a last in-first out connection to form a stack with input and output always being from the top register of said stack.

8. A system according to claim 6 wherein:
said interconnection means includes a crossbar network for connecting each of said registers of said register file to other of said registers of said register file and to the top of the stack register for parallel information transfer.

* * * * *